(12) United States Patent
Xiao et al.

(10) Patent No.: US 11,356,738 B2
(45) Date of Patent: Jun. 7, 2022

(54) AUTOMATIC MODIFICATION OF USER GUIDANCE SEQUENCE RECORDINGS

(71) Applicant: International Business Machines Corporation, Armonk, NY (US)

(72) Inventors: Ping Xiao, Changping (CN); Shi Yu Wang, Beijing (CN); Xue Yong Zhang, Beijing (CN); Ya Peng Dong, Beijing (CN); Xiao Xiao Pei, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 16/189,606

(22) Filed: Nov. 13, 2018

(65) Prior Publication Data
US 2020/0154173 A1 May 14, 2020

(51) Int. Cl.
*H04N 21/472* (2011.01)
*G09B 7/04* (2006.01)
*H04N 21/433* (2011.01)

(52) U.S. Cl.
CPC ......... *H04N 21/47217* (2013.01); *G09B 7/04* (2013.01); *H04N 21/4331* (2013.01)

(58) Field of Classification Search
CPC .............................................. H04N 21/47217
USPC ....................................................... 386/200
See application file for complete search history.

(56) References Cited

U.S. PATENT DOCUMENTS

| 8,472,791 B2 | 6/2013 | Gargi |
| 8,634,694 B2 | 1/2014 | Yachi |
| 8,705,948 B2 | 4/2014 | Hoshino et al. |
| 9,264,777 B2 | 2/2016 | Han et al. |
| 2005/0207733 A1 | 9/2005 | Gargi |
| 2007/0098369 A1 | 5/2007 | Tsai et al. |
| 2008/0299532 A1* | 12/2008 | Edgar ............ G09B 7/00 434/350 |
| 2013/0058633 A1 | 3/2013 | Hoshino et al. |
| 2015/0235561 A1* | 8/2015 | Lynch ............ G06Q 10/063116 434/362 |
| 2016/0063881 A1* | 3/2016 | Brinton .......... G09B 7/00 434/353 |

OTHER PUBLICATIONS

Burge, S. "You Can Now Control the Speed of Video Lessons (/blog/news/speed-videos/)," https://www.ostraining.com/blog/news/speed-videos/, Dec. 2, 2014, 7 pgs.
(Continued)

*Primary Examiner* — Daniel T Tekle
(74) *Attorney, Agent, or Firm* — Jared L. Montanaro

(57) ABSTRACT

A processor may receive a recording. The recording may include one or more user guidance sequences and be displayed to a user. The processor may receive a first user input response to an initiation of a first user guidance sequence. The processor may determine, in response to receiving the first user input, that there is a discrepancy between the first user input and the first user guidance sequence. The processor may automatically modify the playback setting of the recording. The processor may display the discrepancy between the first user input and the first user guidance sequence to the user.

20 Claims, 6 Drawing Sheets

(56) References Cited

OTHER PUBLICATIONS

Unknown, "Controlling Playback Speed in VLC Media Players," https://www.vlchelp.com/controlling-playback-speed-vlc-media-player/, printed Sep. 5, 2018, 22 pgs.
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

AUTOMATIC MODIFICATION OF USER GUIDANCE SEQUENCE RECORDINGS

BACKGROUND

The present disclosure relates generally to the field of computer-assisted education, and more specifically to automatically tailoring an education experience for a user.

Education and training are becoming increasingly more automated and interactive with the evolution of the Internet. Many individuals are turning to online tutorial videos for such education and training. However, each individual learns at a different rate.

SUMMARY

Embodiments of the present disclosure include a method, computer program product, and system for automatically tailoring an education experience for a user. A processor may receive a recording. The recording may include one or more user guidance sequences and be displayed to a user. The processor may receive a first user input response to an initiation of a first user guidance sequence. The processor may determine, in response to receiving the first user input, that there is a discrepancy between the first user input and the first user guidance sequence. The processor may automatically modify the playback setting of the recording. The processor may display the discrepancy between the first user input and the first user guidance sequence to the user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
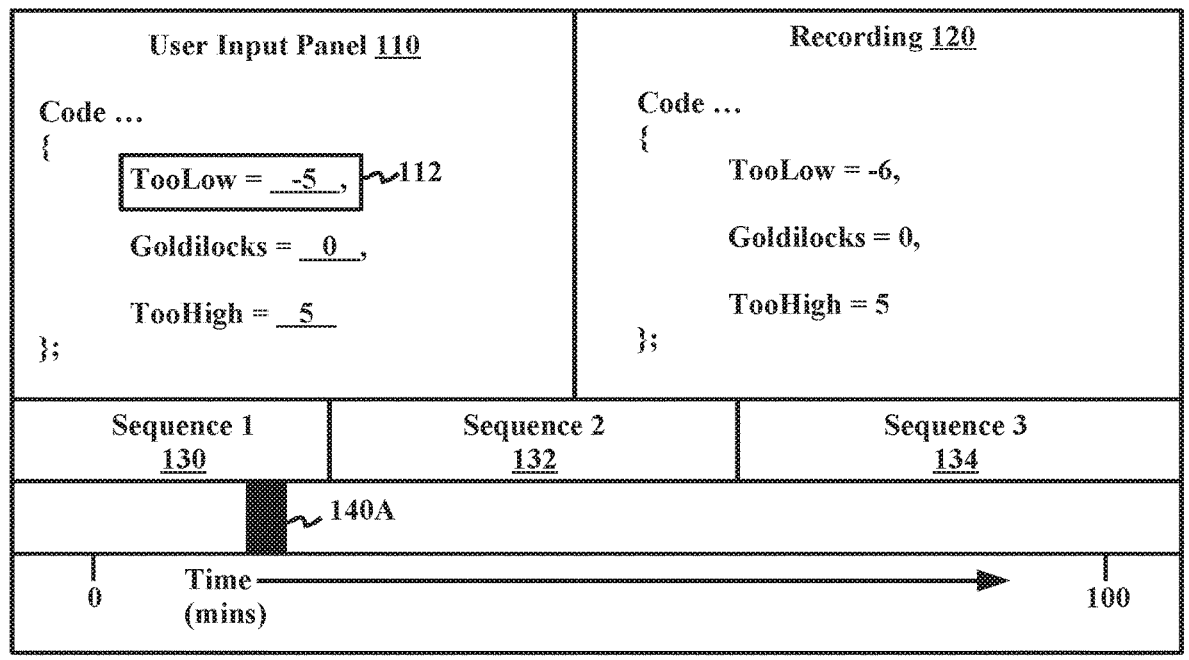
FIGS. 1A and 1B illustrate an example learning environment window, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computer-assisted education, and more specifically to automatically tailoring an education experience for a user. While the present disclosure is not necessarily limited to such applications, various aspects of the disclosure may be appreciated through a discussion of various examples using this context.

Online education and work-training are becoming increasingly prevalent. Many times a tutorial video will be shown to a user (e.g., student, employee, etc.) while the user is mimicking (e.g., copying, repeating, etc.) what is being shown in a side panel. For instance, if the user is a computer engineering student, the user may be watching a coding tutorial video while at the same time, either in the same window displaying the video or in another window, coding the material that is being displayed in the video. This may help the user learn coding by simultaneously viewing and performing the content. Still though, a user may not be able to keep up with the pace of the tutorial video, leading to various mistakes and missed nuances of the video. Alternatively, the user may be more advanced than users that the tutorial video is tailored towards, and the user's progress may be artificially slowed by the tutorial. In order to adequately learn from such online education, a tutorial should be personalized for each user.

Accordingly, in some embodiments, a processor may receive a recording (e.g., of a tutorial). The recording may include one or more user guidance sequences (e.g., training segments, follow-along typing segments, fill-in-the-blank segments, etc.). The recording may also be displayed to a user. The processor may receive, from a user, a first user input in response to an initiation of a first user guidance sequence (e.g., an answer to a question presented in the recording, etc.). The processor may determine, in response to receiving the first user input, that there is a discrepancy between the first user input and the first user guidance sequence (e.g., a wrong answer, etc.). The processor may automatically modify a playback setting of the recording (e.g., rewind, reverse, fast-forward, etc.). The processor may display the discrepancy between the first user input and the first user guidance sequence to the user.

For example, a student may be trying to learn suffixes and may be presented with a vocabulary tutorial recording that includes "fill-in-the-blank" sections of the recording that can be directly typed into the recording as an answer. As the recording plays, the differences between the suffix "-ly" (e.g., which turns a noun into an adjective by giving something the characteristics of the noun) and "-ship" (e.g., which is added to the end of nouns to denote a position held) may be explained and at the end of the explanation, the student may be prompted to fill-in-the-blank of "fellow _____, which is a status held at a university." The student may fill-in-the-blank as "fellowly, which is a status held at a university," however the system displaying the recording (e.g., or the software running the recording application, etc.) may determine that the correct response is "fellowship, which is a status held at a university" (because fellowly means sociable, etc.). The system, by determining that the correct suffix was not used, may rewind the recording back to when the difference between "-ly" and "-ship" was explained. The system may additionally highlight the "-ly"

fill-in-the-blank question to emphasize to the student that the wrong suffix was used and should be changed.

In some embodiments, the one or more user guidance sequences may be individual records (e.g., their own recordings) and the system may play each recording in a coherent, linear fashion for a user to be able to learn. In some embodiments, the one or more user guidance sequences as being associated with the recording, as opposed to being included in the recording. For example, the one or more user guidance sequences may automatically be generated by pulling clips of one or more recordings from a repository (e.g., library, database, etc.) to generated a tailored educational experience for a user.

In some embodiments, the playback setting of the recording may be modified by reverting the recording to when the first user guidance sequence is initiated. The processor may receive a second user input in response to displaying the discrepancy to the user. The processor may determine, in response to receiving the second user input, that there is no discrepancy between the second user input and the first user guidance sequence. The processor may permit the recording to advance (e.g., continue) to a second user guidance sequence.

Following the example above, the recording may again play to the point where the fill-in-the-blank of "fellow _____, which is a status held at a university" is prompted and the user may now answer the fill-in-the-blank as "fellowship, which is a status held at a university." The system may determine that the fill-in-the-blank is now correct and proceed to explain the difference between the suffix "-ate" (e.g., that denotes a state or quality of something and makes a noun a verb) and the suffix "-en" (e.g., that denotes what something is made of or has a nature of and turns a noun into an adjective). The system may then provide the user with a second fill-in-the-blank prompt of "correl _____, which means to have a mutual relationship." (e.g., the correct answer being "correlate").

In some embodiments, the processor may identify that the discrepancy does not meet a discrepancy threshold at a first time. The first time may occur during the first user guidance sequence. The processor may identify that the discrepancy does not meet the discrepancy threshold at a second time. The second time may occur during the first user guidance sequence and may be subsequent to the first time. The processor may determine to modify the playback setting of the recording by advancing (e.g., fast-forwarding, etc.) the recording to when a second user guidance sequence is initiated. The processor may advance the recording to when the second user guidance sequence is initiated.

For example, a programmer may be learning a new version of a coding language by doing online tutorials. The tutorial may include a follow-along recording where the recording shows what the programmer should be coding and a window where the programmer should follow along and input their corresponding code. The window may simultaneously display a fill-in area for the code as the recording is playing. The fill-in area may include multiple fill-in areas, such as: "{max=_____, _____ =−10}."

The system running the tutorial may identify that 30 seconds into the recording the user has already correctly filled in the areas to be "{max=10, min=−10}," and determine that the recording does not need to be rewound. Additionally, at 45 seconds into the recording, the system may identify again that the areas have been correctly filled in and that the areas were filled before the recording reached the point where the "min" should be inserted. The system may then determine that the user knows this set of coding functions and can skip to another topic within the recording, such as coding for libraries, etc.

In some embodiments, the processor may generate a user input panel (e.g., window, box, etc.). The user input panel may be paired with the recording. The processor may analyze the user input panel at one or more times during the first user guidance sequence. The processor may emphasize, with an indicator (e.g., highlight, marker, etc.), the discrepancy in the user input panel.

In some embodiments, the processor may identify the discrepancy at a first time. The processor may identify a second discrepancy at a second time, the second discrepancy being triggered by the discrepancy. The processor may revert the recording to the first time. The processor may emphasize, with a second indicator, the discrepancy in the recording.

For example, a math student may be following a math tutorial on finding variables and be prompted with the following chain of equations in a user input panel: 5x −5=25, and y=x+1. The tutorial may pause for the user to try to solve the equations and identify that the user has finished solving for x and y. Upon finishing the equations, the system may begin playing the tutorial and showing the user how to solve for x and y $$\left(\text{e.g., } x = \frac{25+5}{5} = 6, \text{ and } y = 6+1 = 7\right),$$

however, the math student may have solved for $$x = \frac{25-5}{5} = 4 \text{ and } y = 4+1 = 5.$$

The system playing the tutorial may highlight the x in the input panel to indicate that x was solved for incorrectly, leading to the incorrect outcome to y. The system may additionally revert back to and highlight (e.g., in a same or different color as what x was highlighted with) the area within the tutorial where x is correctly solved. The tutorial may then play the tutorial forward from the area until it is determined that the math student has correctly found x and y.

In some embodiments, the processor may tag the recording with one or more markers (e.g., emoticons, icons, hashes, etc.). The one or more markers may indicate where in the recording each of the discrepancies occurred. The processor may analyze the user input panel at each of the markers during a subsequent display of the recording to the user (e.g., or a second user). The processor may determine, from the analyzing, that the same discrepancy occurred in the subsequent display of the recording. The processor may update one or more user guidance sequence rules for the first user guidance sequence. In some embodiments, updating the one or more user guidance sequence rules may include incorporating a first rule that reduces the playback setting of the first user guidance sequence in the recording.

For example, the same onboarding tutorial may be given to all 100 employees at a particular company and the first 20 employees interacting with the tutorial may have each missed the same interactive question. The server storing the tutorial may identify the area in which the information regarding the missed interactive question is being taught and mark the area for further review. The system may let 5 more employees interact with the tutorial. However, because of the marker the system may slow the playback setting of the tutorial during the information section regarding the missed interactive question, allowing the employees more time to understand and follow the information. The system may identify that only 1 of the 5 more employees missed the interactive question now and the system may determine that the marked area should continue having a slow playback setting than the rest of the tutorial for the subsequent viewings of the remaining 75 employees.

Figure 1B:
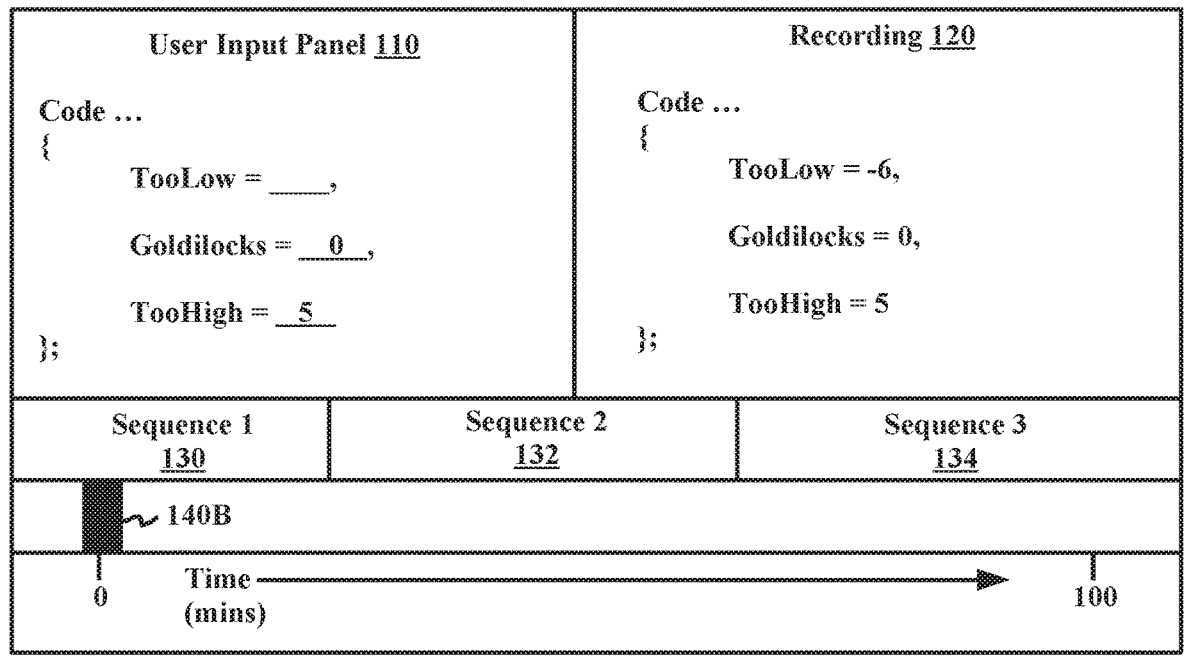

Referring now to FIGS. 1A and 1B, illustrated is an example learning environment window 100, in accordance with embodiments of the present disclosure. It is noted that like reference numerals are used to designate like parts in the accompanying drawings. In some embodiments, the environment window 100 of FIGS. 1A and 1B include a user input panel 110, a recording 120, a first sequence 130, a second sequence 132, and a third sequence 134. In some embodiments, the user input panel 110 of FIG. 1A includes an indicator 112. In some embodiments, the learning environment window 100 of FIG. 1A includes a play-bar 140A at a first time and the learning environment window 100 of FIG. 1B includes a play-bar 140B at a second time. It is noted that the play-bars 140A and 140B may be the same play-bar but at different designated play times of the recording 120 presented in the learning environment window 100.

In some embodiments, the learning environment window 100 may present the recording 120 to a user while simultaneously presenting the user panel 110. The recording 120 may start at a time 0, and display to the user a "follow-a-long" coding tutorial. Presented along with the recording 120 may be a "fill-in-the-blank" section in the user input panel 110 (as depicted in in FIG. 1B), the input panel 110 mirroring the content being and/or going to be displayed to the user in the recording 120. In some embodiments, the "fill-in-the-blank" section may not appear in the user input panel 110 until after the first sequence 130 is initiated.

In some embodiments, the user may input their presumed response to the "fill-in-the-blank" section in the user input panel 110, as depicted by "−5" in FIG. 1A. The user may have input their response before the tutorial for the first sequence 130 had been displayed to the user. In some embodiments, a system providing the support for displaying the learning environment window 100 detects at a first time, as indicated by the play-bar 140A, that there is a discrepancy between the user's inputted response of "−5" in the user input panel 110 and the correct response of "−6" as displayed in the recording 120. The system then generates the indicator 112, which indicates to the user that the response of "−5" is incorrect. In some embodiments, the indicator 112 may be a highlight, a text color change, a symbol, etc.

In some embodiments, after detecting the discrepancy, and indicating with the indicator 112 that the user input of "−5" was incorrect, the system rewinds the recording 120 and/or the user input panel 110 to a second time, as indicated by the play-bar 140B (it is noted that the second time, as indicated by the play-bar 140B, may also be a first time indicating the first time the first sequence 130 is presented to a user). This ensures that the user is taken back to the correct playtime where the discrepancy was likely to have occurred and so that the user can re-watch the tutorial for the first sequence 130 in the recording 120. In some embodiments, the system may delete the user's input response of "−5," leaving a blank "fill-in-the-blank" section again, as depicted by FIG. 1B. In some embodiments, the system may allow the user to decline the rewinding of the recording 120 and the refreshing of the user input panel 110 in the case the user feels that re-watching the tutorial would not be beneficial.

In some embodiments, the user may have input the correct response into the user input panel 110 and no discrepancy may have been detected by the system and the system may fast-forward (e.g., advance, move to a different/forward location within the recording, etc.) the recording 120 to a subsequent sequence (e.g., the second sequence 132 or the third sequence 134). The system may fast-forward, or even skip a sequence (e.g., go straight to the third sequence 134 without initiating the second sequence 132) if the discrepancy does not exceed a discrepancy threshold. This may allow a user to forgo being presented information the user may already know/understand.

It is noted that the automatic adjustment of playback setting (e.g., fast-forwarding, rewinding, speeding/slowing of the playback setting, etc.) increases the processing speed of a system by allowing the system to most efficiently present a recording to a user. Thus allowing the system to free-up resources (e.g., processors, RAM, etc.) upon the expeditious, tailored displaying of the recording. The system no longer uses resources to present unneeded recording segments to a user, allowing the resources to be used for other functions. It is additionally noted, that the automatic adjustment of the recording 120 and the user input panel 110 lend themselves to improve a user's ability to use a program and/or a user interface associated with a tutorial displayed by the recording 120.

Figure 2:
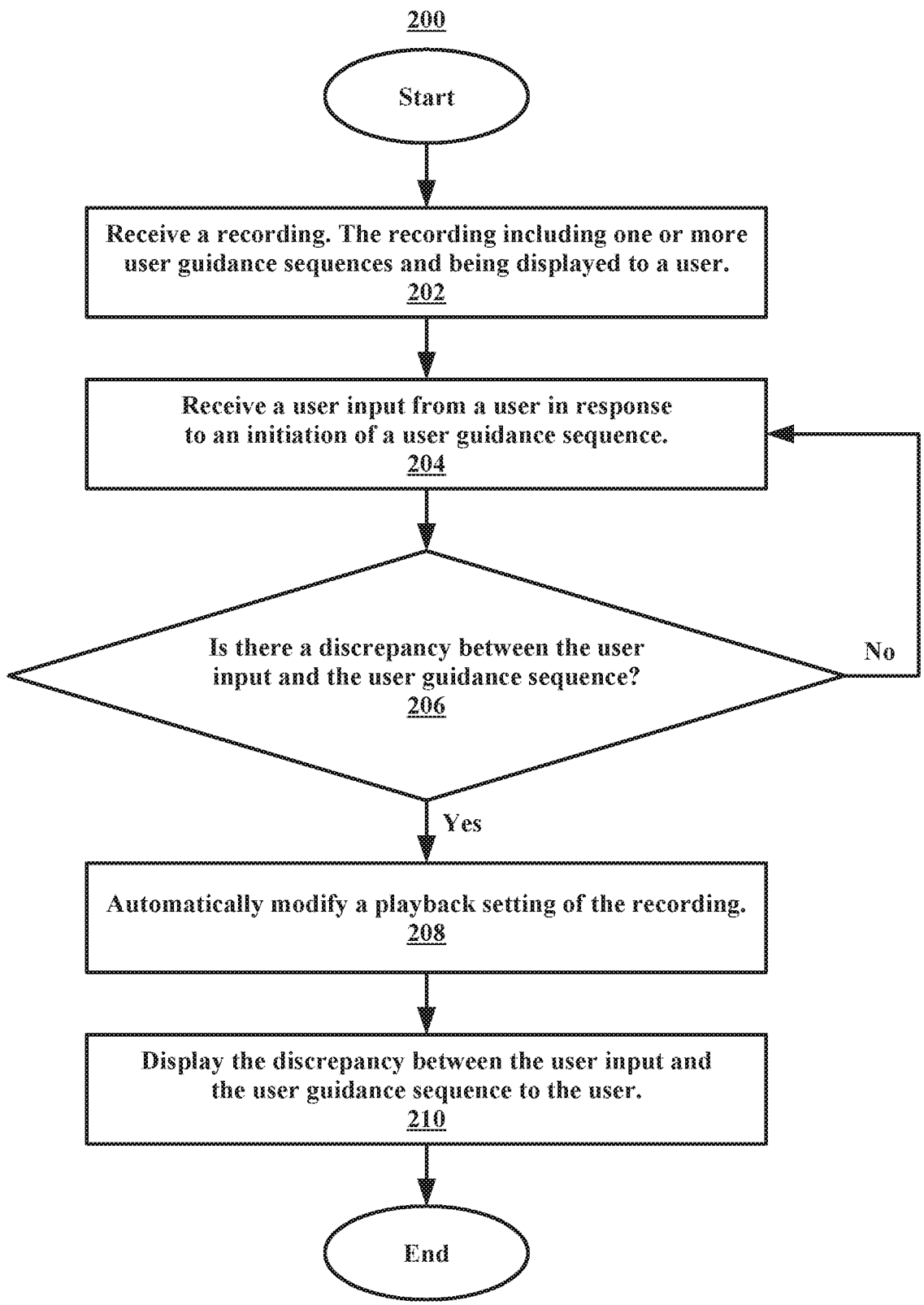
FIG. 2 illustrates a flowchart of an example method for displaying discrepancies between a user input and a user guidance sequence to a user, in accordance with embodiments of the present disclosure.

Referring now to FIG. 2, illustrated is a flowchart of an example method 200 for displaying discrepancies between a user input and a user guidance sequence to a user, in accordance with embodiments of the present disclosure. In some embodiments, the method 200 may be performed by a processor (e.g., or a processor in a system, a system, etc.). In some embodiments, the method 200 begins at operation 202 where the processor receives a recording. The recording includes one or more user guidance sequences and is displayed to a user.

The method 200 proceeds to operation 204 where the processor receives user input from a user in response to an initiation of a user guidance sequence. The method 200 proceeds to the decision block 206 where it is determined whether or not there is a discrepancy between the user input and the user guidance sequence. If, at decision block 206, it is determined that there is no discrepancy between the user input and the user guidance sequence, the method 200 loops back to operation 204, where a subsequent response to a subsequent user guidance sequence is received. In some embodiments, if, at decision block 206, it is determined that there is no discrepancy between the user input and the user guidance sequence, the method 200 ends.

If, at decision block 206, it is determined that there is discrepancy between the user input and the user guidance sequence, the method 200 proceeds to operation 208. At operation 208, the processor automatically modifies a playback setting of the recording (e.g., fast-forward, skip, reverse, rewind, slow-down/speed-up rate of scene display of the recording, etc.). The method 200 proceeds to operation 210 where the discrepancy between the user input and the user guidance sequence is displayed to the user. In some embodiments, after operation 210, the method 200 ends.

For example, a user may be learning how to use architecture software by following a "how-to" guide provided by the software. The "how-to" guide may include a display area that shows the features/functions of what the software can do, and a user interaction area where the user can mirror the features/functions being presented. The "how-to" guide may begin (e.g., a first user guidance sequence) by highlighting a "piping" icon that is a feature provided in the software that determines where all pipes should be installed in a new dwelling. The user may then find the "piping" icon in the user interaction area and click the icon, the software may determine that the user correctly found the icon and proceed to show the user in the display area how to add more pipes (e.g., a subsequent user guidance sequence) if desired, e.g., for an extra sink, etc.

For adding more pipes, the "how-to" guide may highlight multiple icons in a specific order: 1) an elbow pipe, 2) a 3-foot pipe, and 3) a pipe cap. The user may try to follow, in the user interaction area, the order in which the icons were selected in the "how-to" guide, but the user may choose the order of: 1) a 3-foot pipe, 2) an elbow pipe, and 3) a pipe cap. The software playing the "how-to" guide may determine that the order is incorrect and automatically rewind the "how-to" guide back to the beginning of when the order is selected. The software may additionally highlight the icons in the user interaction area in the correct order (e.g., by putting icons indicating the order, for instance, a 1 next to the elbow pipe, a 2 next to the 3-foot pipe, and a 3 next to the pipe cap, etc.). This may allow the user to correctly learn the order in which to manually add pipes. In some embodiments, the user could again incorrectly input the order and the software could again automatically rewind the "how-to" guide, but additionally slow the frame rate at which the "how-to" guide is playing in order for the user to have more time viewing the order of selection.

In some embodiments, a camera (e.g., video camera, recorder, etc.) may analyze the moments of the user while they are physically working on a project. For example, a user may be putting together a piece of furniture and a tutorial video that includes user analyzation software (e.g., movement detection, object recognition, etc.) may be included with the instructions on how to piece the furniture together. As the user is piecing the furniture together a camera associated with a device (e.g., a computer, a smartphone, etc.) playing the tutorial video may analyze the movements of the user and analyze the pieces of furniture in the user's hand(s). The device may determine that the user has the wrong part of the furniture for the step that they should be on, the device may then alert the user (e.g., beep, etc.) and rewind the tutorial video back to a place where the correct part of the furniture is clearly seen.

Figure 3:
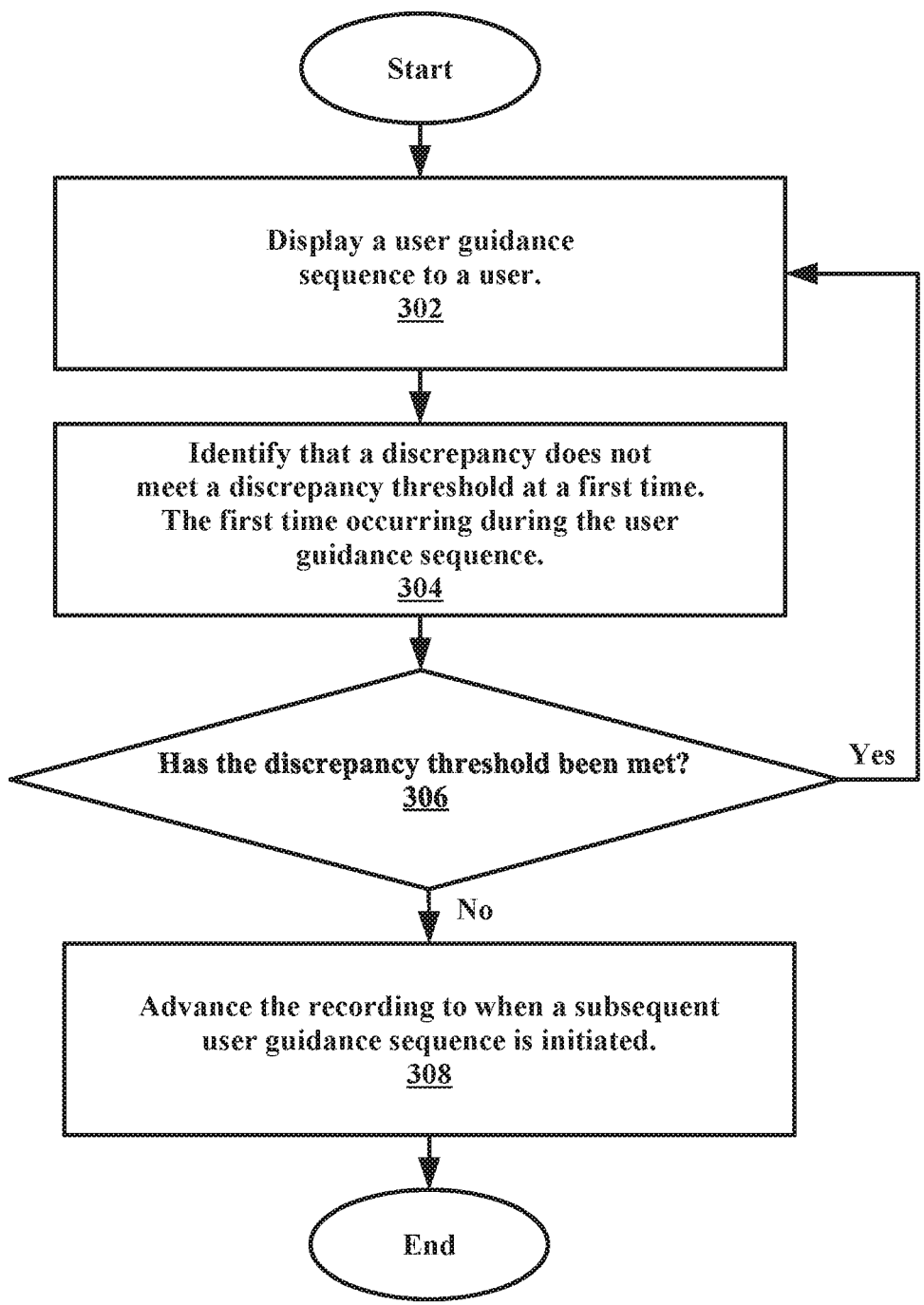
FIG. 3 illustrates a flowchart of an example method for determining to advance a recording to a subsequent user guidance sequence, in accordance with embodiments of the present disclosure.

Referring now to FIG. 3, illustrated is a flowchart of an example method 300 for determining to advance a recording to a subsequent user guidance sequence, in accordance with embodiments of the present disclosure. In some embodiments, the method 300 may be performed by a processor (e.g., or a processor in a system, a system, etc.). In some embodiments, the method 300 may be an extension of the method 200 presented in FIG. 2.

In some embodiments, the method 300 begins at operation 302 where a processor displays (e.g., on a recording device, on a display, on a computer screen, etc.) a user guidance sequence to a user. The method 300 proceeds to operation 304 where the processor identifies that a discrepancy (e.g., the same discrepancy as determined in decision block 206 of FIG. 2) does not meet a discrepancy threshold at a first time. The first time occurring during the user guidance sequence.

The method 300 proceeds to decision block 306 where the processor determines whether the discrepancy meets a discrepancy threshold at a subsequent time (e.g., a second time, a third time, etc.). The subsequent time occurring during the user guidance sequence and subsequent to the first time. If, at decision block 306, it is determined that the discrepancy threshold has been met, the method 300 may loop back to operation 302 where the processor may re-display the user guidance sequence of the user until the discrepancy threshold is not met (e.g., the user inputs a correct response/answer to the user guidance sequence). If, at decision block 306, it is determined that the discrepancy threshold has not been met, the method 300 proceeds to operation 308 where the processor advances the recording to when a subsequent (e.g., a second, a third, etc.) user guidance sequence is initiated. In some embodiments, after operation 308, the method 300 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
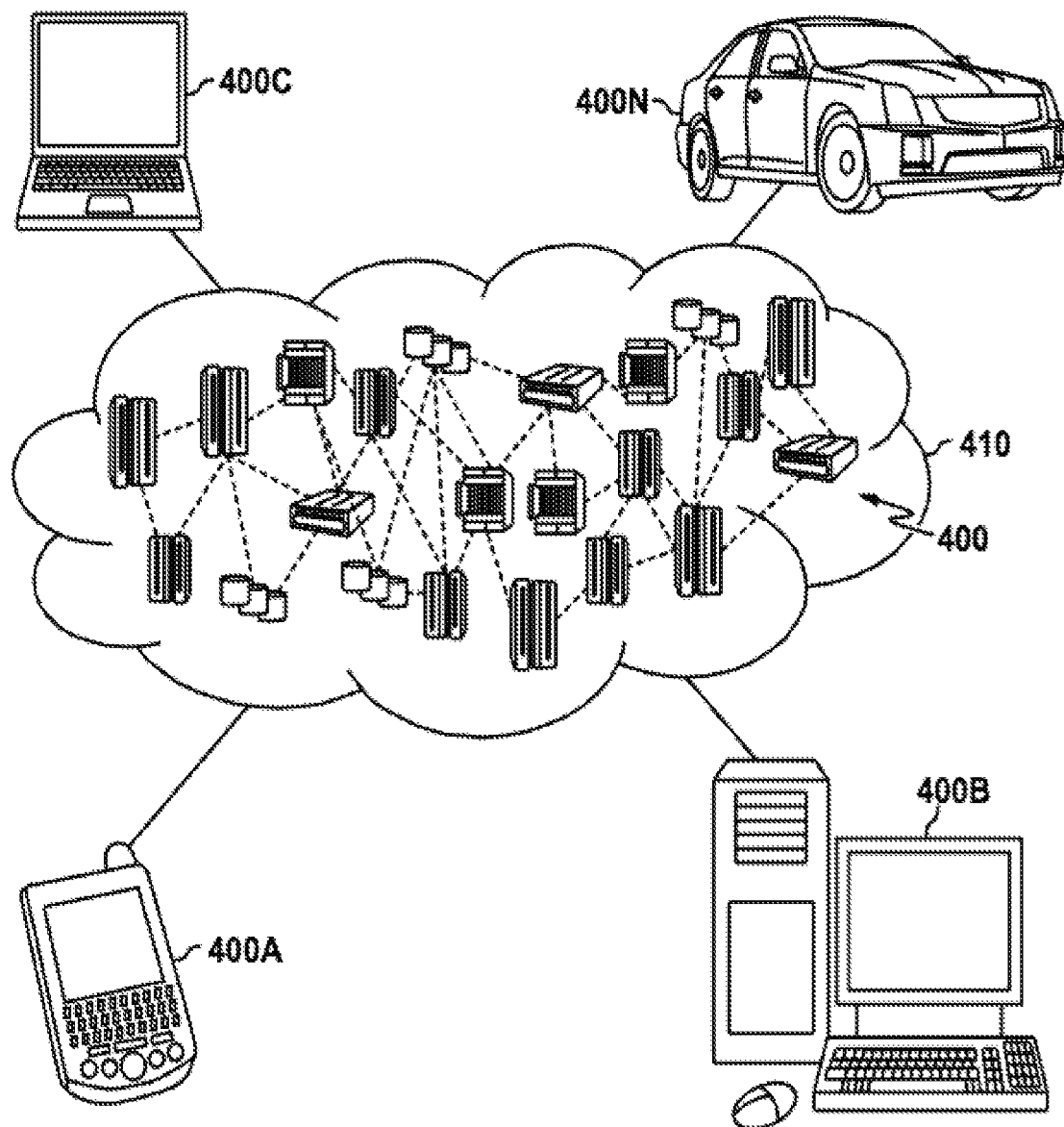
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
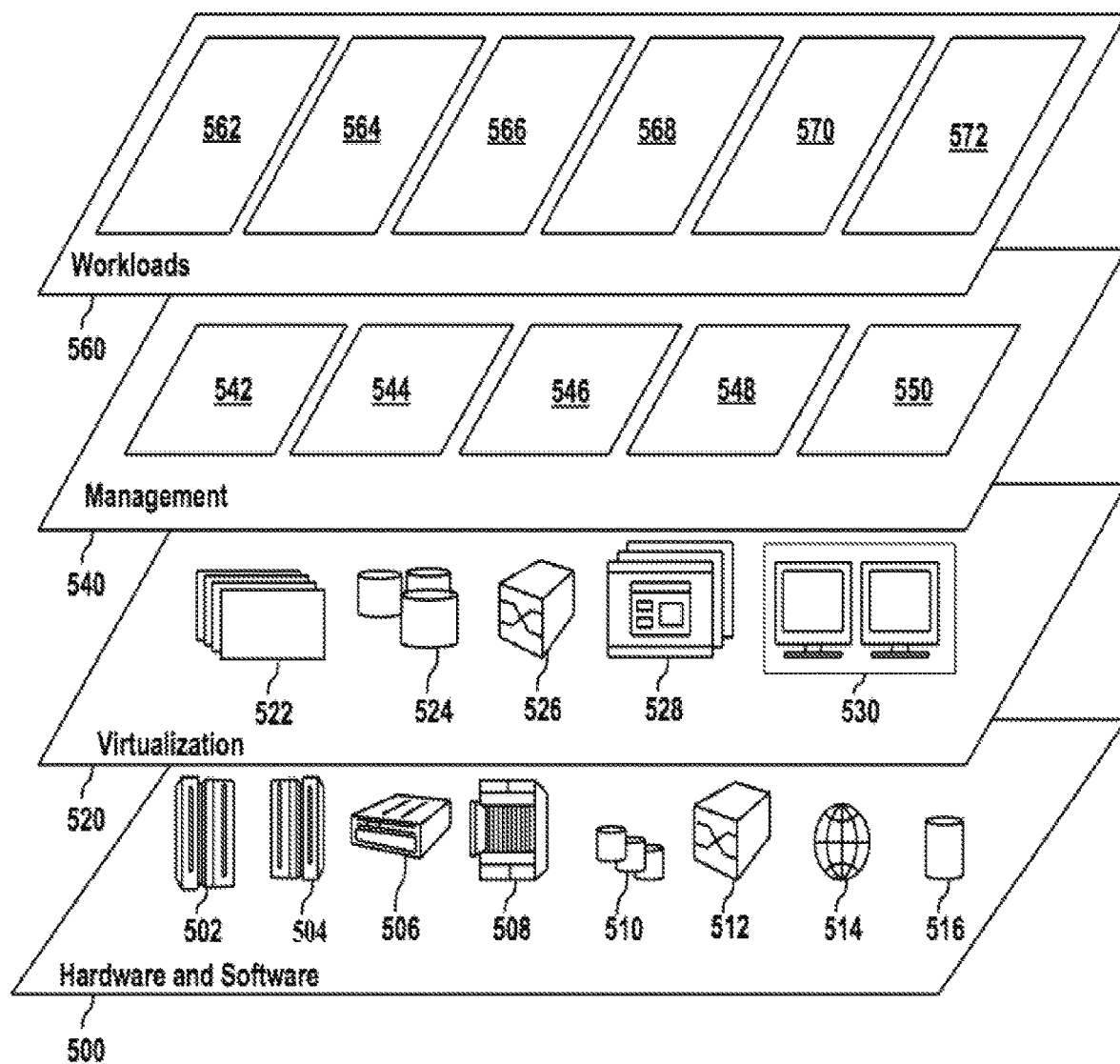
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and user guidance sequence processing 572.

Figure 6:
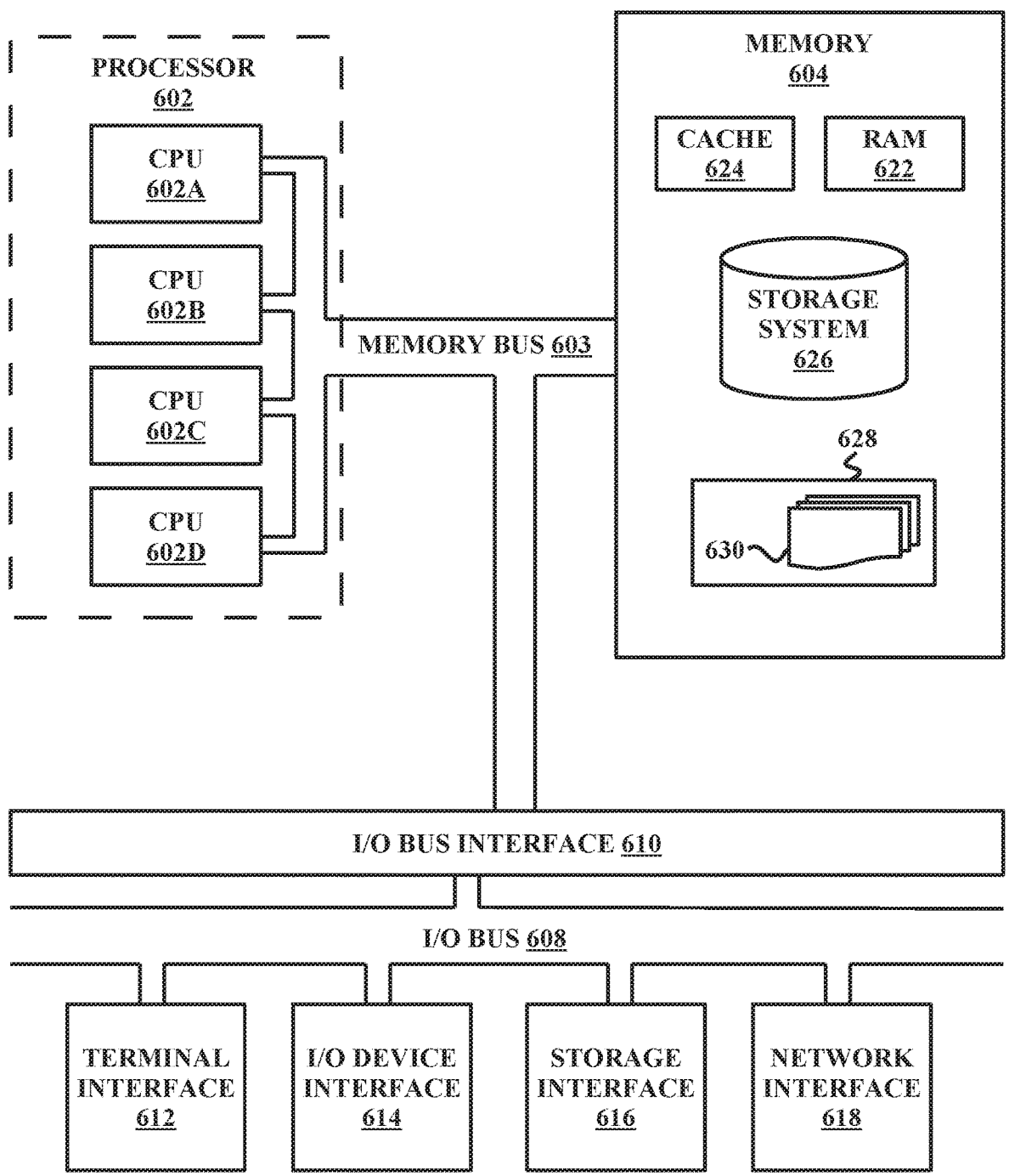
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   receiving, by a processor, a recording, wherein the recording includes one or more user guidance sequences, and wherein the recording is displayed to one or more users;
   receiving, from each of the one or more users, a first user input in response to an initiation of a first user guidance sequence;
   determining, in response to receiving the first user input, that there is a discrepancy between the first user input and the first user guidance sequence, wherein the first user guidance sequence is a prompt for a typing segment, wherein the user input includes the typing segment, and wherein the discrepancy is when the first user input and the first user guidance sequence does not match;
   identifying that a threshold number of the one or more users has provided the discrepancy in the first user input;
   modifying, automatically, a playback setting of the recording; and
   displaying the discrepancy between the first user input and the first user guidance sequence to the one or more users.

2. The method of claim 1, wherein the playback setting is a function that determines the advancement of the one or more user guidance sequences upon determination of a discrepancy between a user input and at least one of the one or more user guidance sequences, wherein the playback setting of the recording is modified by reversing the recording to when the first user guidance sequence is initiated, and wherein the method further comprises:
   receiving a second user input in response to displaying the discrepancy to the one or more users;
   determining, in response to receiving the second user input, that there is no discrepancy between the second user input and the first user guidance sequence; and
   permitting the recording to advance to a second user guidance sequence.

3. The method of claim 1, further comprising:
   identifying that the discrepancy does not meet a discrepancy threshold at a first time, wherein the first time occurs during the first user guidance sequence;

determine that the discrepancy does not meet the discrepancy threshold at a second time, wherein the second time occurs during the first user guidance sequence and is subsequent to the first time;

modifying the playback setting of the recording by advancing the recording to when a second user guidance sequence is initiated.

4. The method of claim 1, further comprising:

generating a user input panel, wherein the user input panel is paired with the recording;

analyzing the user input panel at one or more times during the first user guidance sequence; and emphasizing, with an indicator, the discrepancy in the user input panel.

5. The method of claim 4, further comprising:

identifying the discrepancy at a first time;

identifying a second discrepancy at a second time, wherein the second discrepancy is triggered by the discrepancy;

reversing the recording to the first time; and emphasizing, with a second indicator, the second discrepancy in the recording.

6. The method of claim 5, further comprising:

tagging the recording with one or more markers, wherein the one or more markers indicate where in the recording each of the discrepancies occurred;

analyzing the user input panel at each of the markers during a subsequent display of the recording to the one or more users;

determining, from the analyzing, that the same discrepancy occurred in the subsequent display of the recording; and updating one or more user guidance sequence rules for the first user guidance sequence.

7. The method of claim 6, wherein updating the one or more user guidance sequence rules includes incorporating a first rule for reducing the playback setting of the first user guidance sequence in the recording.

8. A system comprising:

a memory; and a processor in communication with the memory, the processor being configured to perform operations comprising:

receiving a recording, wherein the recording includes one or more user guidance sequences, and wherein the recording is displayed to one or more users;

receiving, from each of the one or more users, a first user input in response to an initiation of a first user guidance sequence;

determining, in response to receiving the first user input, that there is a discrepancy between the first user input and the first user guidance sequence, wherein the first user guidance sequence is a prompt for a typing segment, wherein the user input includes the typing segment, and wherein the discrepancy is when the first user input and the first user guidance sequence does not match;

identifying that a threshold number of the one or more users has provided the discrepancy in the first user input;

modifying, automatically, a playback setting of the recording; and displaying the discrepancy between the first user input and the first user guidance sequence to the one or more users.

9. The system of claim 8, wherein the playback setting is a function that determines the advancement of the one or more user guidance sequences upon determination of a discrepancy between a user input and at least one of the one or more user guidance sequences, wherein the playback setting of the recording is modified by reversing the recording to when the first user guidance sequence is initiated, and wherein the operations further comprise:

receiving a second user input in response to displaying the discrepancy to the one or more users;

determining, in response to receiving the second user input, that there is no discrepancy between the second user input and the first user guidance sequence; and permitting the recording to advance to a second user guidance sequence.

10. The system of claim 8, wherein the operations further comprise:

identifying that the discrepancy does not meet a discrepancy threshold at a first time, wherein the first time occurs during the first user guidance sequence;

determine that the discrepancy does not meet the discrepancy threshold at a second time, wherein the second time occurs during the first user guidance sequence and is subsequent to the first time;

modifying the playback setting of the recording by advancing the recording to when a second user guidance sequence is initiated.

11. The system of claim 8, wherein the operations further comprise:

generating a user input panel, wherein the user input panel is paired with the recording;

analyzing the user input panel at one or more times during the first user guidance sequence; and emphasizing, with an indicator, the discrepancy in the user input panel.

12. The system of claim 11, wherein the operations further comprise:

identifying the discrepancy at a first time;

identifying a second discrepancy at a second time, wherein the second discrepancy is triggered by the discrepancy;

reversing the recording to the first time; and emphasizing, with a second indicator, the second discrepancy in the recording.

13. The system of claim 12, wherein the operations further comprise:

tagging the recording with one or more markers, wherein the one or more markers indicate where in the recording each of the discrepancies occurred;

analyzing the user input panel at each of the markers during a subsequent display of the recording to the one or more users;

determining, from the analyzing, that the same discrepancy occurred in the subsequent display of the recording; and updating one or more user guidance sequence rules for the first user guidance sequence.

14. The system of claim 13, wherein updating the one or more user guidance sequence rules includes incorporating a first rule for reducing the playback setting of the first user guidance sequence in the recording.

15. A computer program product comprising a computer readable storage medium having program instructions embodied therewith, the program instructions executable by a processor to cause the processor to perform a method, the method comprising:

receiving a recording, wherein the recording includes one or more user guidance sequences, and wherein the recording is displayed to one or more users;

receiving, from each of the one or more users, a first user input in response to an initiation of a first user guidance sequence;

determining, in response to receiving the first user input, that there is a discrepancy between the first user input and the first user guidance sequence, wherein the first user guidance sequence is a prompt for a typing segment, wherein the user input includes the typing segment, and wherein the discrepancy is when the first user input and the first user guidance sequence does not match;

identifying that a threshold number of the one or more users has provided the discrepancy in the first user input;

modifying, automatically, a playback setting of the recording; and displaying the discrepancy between the first user input and the first user guidance sequence to the one or more users.

16. The computer program product of claim 15, wherein the playback setting is a function that determines the advancement of the one or more user guidance sequences upon determination of a discrepancy between a user input and at least one of the one or more user guidance sequences, wherein the playback setting of the recording is modified by reversing the recording to when the first user guidance sequence is initiated, and wherein the method further comprises:

receiving a second user input in response to displaying the discrepancy to the one or more users;

determining, in response to receiving the second user input, that there is no discrepancy between the second user input and the first user guidance sequence; and permitting the recording to advance to a second user guidance sequence.

17. The computer program product of claim 15, further comprising:

identifying that the discrepancy does not meet a discrepancy threshold at a first time, wherein the first time occurs during the first user guidance sequence;

determine that the discrepancy does not meet the discrepancy threshold at a second time, wherein the second time occurs during the first user guidance sequence and is subsequent to the first time;

modifying the playback setting of the recording by advancing the recording to when a second user guidance sequence is initiated.

18. The computer program product of claim 15, further comprising:

generating a user input panel, wherein the user input panel is paired with the recording;

analyzing the user input panel at one or more times during the first user guidance sequence; and emphasizing, with an indicator, the discrepancy in the user input panel.

19. The computer program product of claim 18, further comprising:

identifying the discrepancy at a first time;

identifying a second discrepancy at a second time, wherein the second discrepancy is triggered by the discrepancy;

reversing the recording to the first time; and emphasizing, with a second indicator, the second discrepancy in the recording.

20. The computer program product of claim 19, further comprising:

tagging the recording with one or more markers, wherein the one or more markers indicate where in the recording each of the discrepancies occurred;

analyzing the user input panel at each of the markers during a subsequent display of the recording to the one or more users;

determining, from the analyzing, that the same discrepancy occurred in the subsequent display of the recording; and updating one or more user guidance sequence rules for the first user guidance sequence, wherein updating the one or more user guidance sequence rules includes incorporating a first rule for reducing the playback setting of the first user guidance sequence in the recording.

* * * * *